United States Patent
Sun

(10) Patent No.: US 8,801,117 B2
(45) Date of Patent: Aug. 12, 2014

(54) ELECTRONIC DEVICE WITH DUMMY HARD DISK DRIVE

(75) Inventor: Zheng-Heng Sun, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 149 days.

(21) Appl. No.: 13/338,254

(22) Filed: Dec. 28, 2011

(65) Prior Publication Data

US 2013/0164490 A1    Jun. 27, 2013

(30) Foreign Application Priority Data

Dec. 21, 2011  (CN) .......................... 2011 1 0432377

(51) Int. Cl.
*A47B 81/00*  (2006.01)

(52) U.S. Cl.
USPC ........................................................ 312/223.2

(58) Field of Classification Search
USPC .......... 312/348.1, 348.2, 348.4, 330.1, 223.1, 312/223.2; 220/6, 7
See application file for complete search history.

(56) References Cited

U.S. PATENT DOCUMENTS

| | | | | |
|---|---|---|---|---|
| 2,498,558 A * | 2/1950 | Lantz | ............................... | 108/33 |
| 4,170,313 A * | 10/1979 | Caves et al. | ....................... | 220/7 |
| 4,822,965 A * | 4/1989 | Hyogo et al. | .................. | 200/333 |
| 4,887,874 A * | 12/1989 | Joffe | .............................. | 312/258 |
| 5,141,124 A * | 8/1992 | Smith et al. | .................... | 220/831 |
| 5,230,551 A * | 7/1993 | Kramer | ......................... | 312/204 |
| 6,155,444 A * | 12/2000 | Liu | .................................... | 220/7 |
| 6,446,825 B1 * | 9/2002 | Godoy | ............................. | 220/6 |
| 7,017,765 B2 * | 3/2006 | Overholt | .......................... | 220/6 |
| 7,128,231 B2 * | 10/2006 | Overholt | ..................... | 220/4.28 |
| 7,264,122 B2 * | 9/2007 | Koefelda et al. | .............. | 206/600 |
| 7,861,879 B2 * | 1/2011 | Samprathi | ........................ | 220/7 |
| 2004/0095716 A1 * | 5/2004 | McAlister | ..................... | 361/685 |
| 2007/0017916 A1 * | 1/2007 | Sabanci | ............................ | 220/7 |
| 2012/0273639 A1 * | 11/2012 | Sun | ............................ | 248/309.1 |

* cited by examiner

*Primary Examiner* — Matthew Ing
(74) *Attorney, Agent, or Firm* — Novak Druce Connolly Bove + Quigg LLP

(57) ABSTRACT

An electronic device includes a base, two parallel mounting plates extending from the base, and a dummy hard disk drive. Each of the mounting plates defines two mounting holes. The dummy hard disk drive includes a bottom plate, two side plates pivotably mounted to two opposite sides of the bottom plate, and two end plates pivotably mounted to two opposite ends of the bottom plate. Two mounting rods extend from an outer surface of each of the side plates. The side plates and the end plates can hinge so as to be substantially perpendicular to the bottom plate, to form a hollow rectangular frame. The mounting rods are inserted in the corresponding mounting holes, to mount the dummy hard disk drive between the mounting plates.

9 Claims, 8 Drawing Sheets

ELECTRONIC DEVICE WITH DUMMY HARD DISK DRIVE

CROSS-REFERENCE TO RELATED APPLICATION

Relevant subject matter is disclosed in a pending U.S. patent application, with application Ser. No. 13/282,477, filed on Oct. 27, 2011, and entitled "DUMMY HARD DISK DRIVE", which is assigned to the same assignee with this patent application.

BACKGROUND

1. Technical Field

The present disclosure relates to an electronic device having a dummy hard disk drive (HDD).

2. Description of Related Art

An electronic device, such as a computer or a server, includes a plurality of brackets for mounting HDDs. A dummy HDD may be fitted in each bracket to avoid the bracket from being deformed or damaged when manufacturing or transporting the electronic device. When a real HDD is received in the bracket, the dummy HDD will be taken out. However, a traditional dummy HDD may be a fixed structure, and not foldable, which causes a waste of space when the dummy HDD is boxed and transported. Moreover, screws are required to fix the dummy HDD to the bracket, which is inconvenient.

BRIEF DESCRIPTION OF THE DRAWINGS

Many aspects of the present embodiments can be better understood with reference to the drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
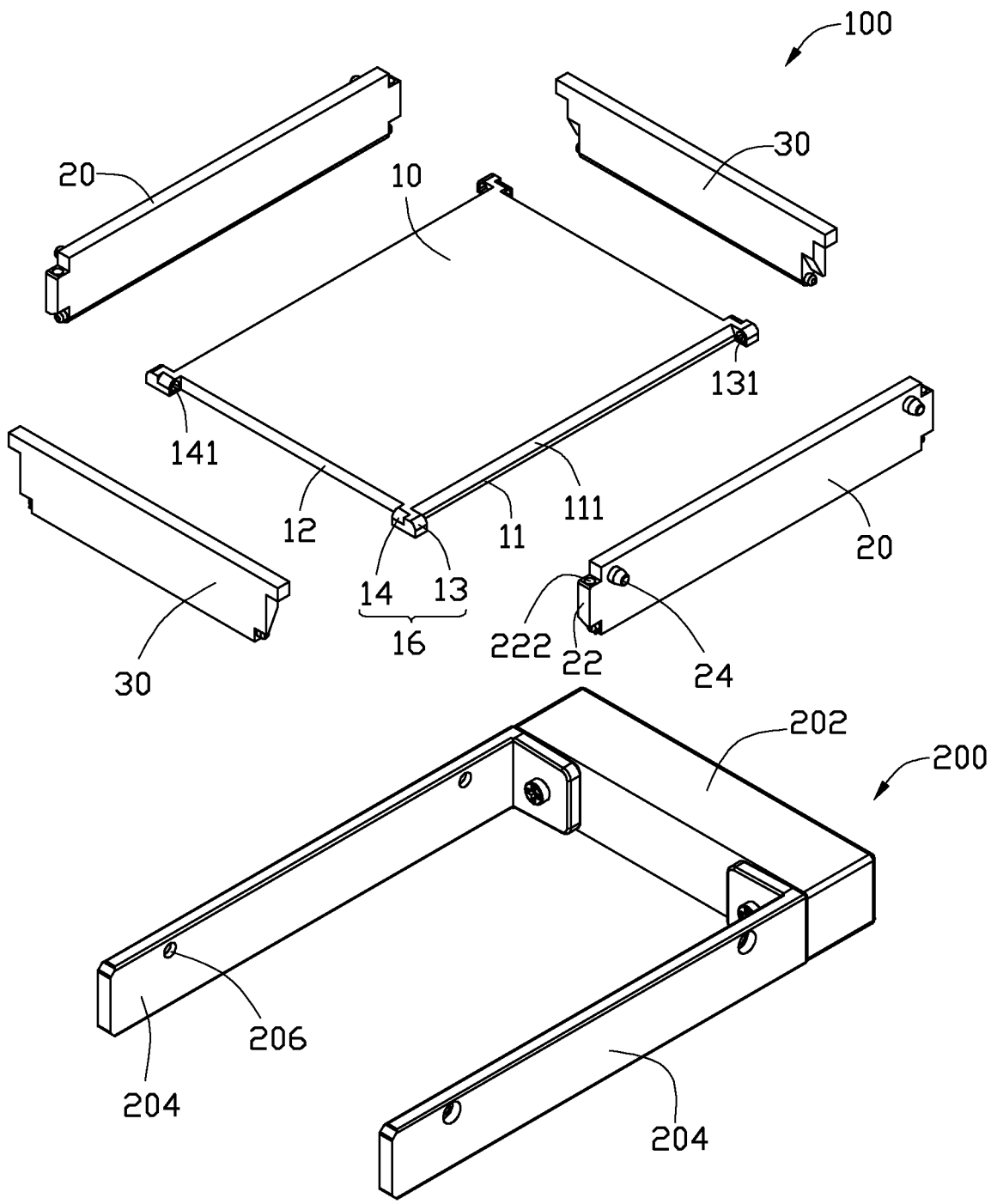
FIG. 1 is an exploded, isometric view of an embodiment of an electronic device, wherein the electronic device includes a dummy hard disk drive (HDD).
Figure 2:
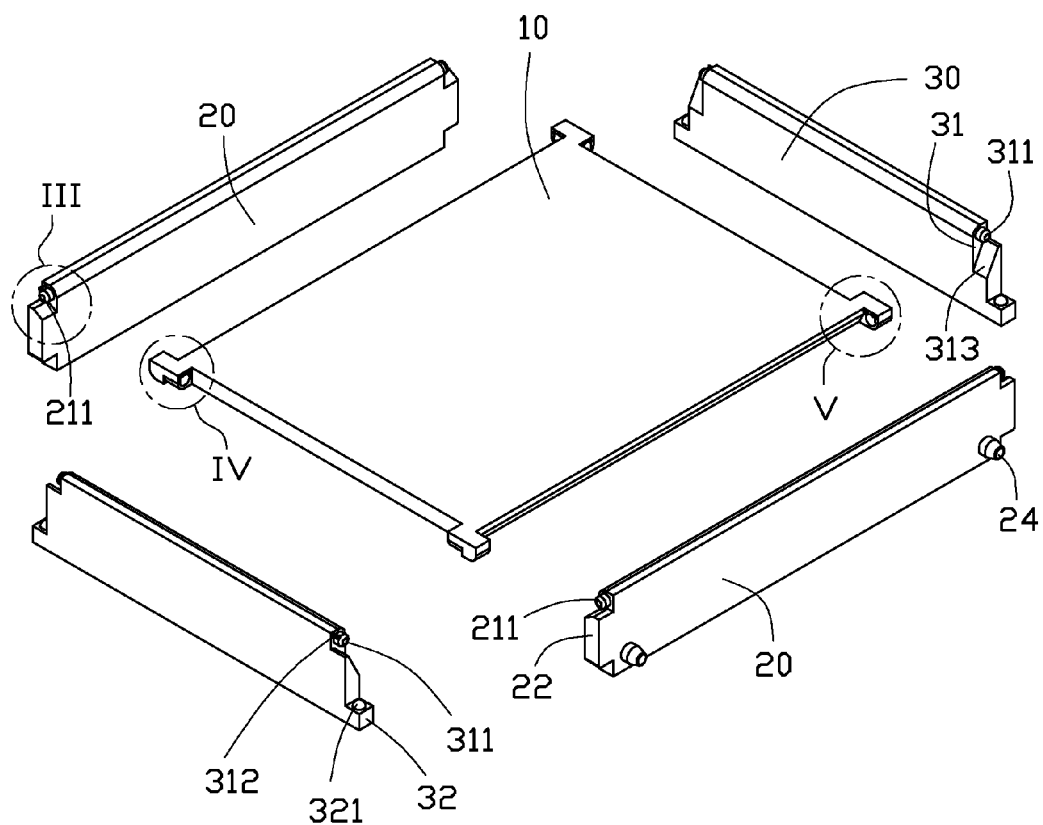
FIG. 2 is an inverted view of the dummy HDD of FIG. 1.

Referring to FIGS. 1 and 2, an embodiment of an electronic device includes a dummy hard disk drive (HDD) 100 and an HDD bracket 200 receiving the dummy HDD 100. The dummy HDD 100 includes a substantially rectangular bottom plate 10, two side plates 20 pivotably mounted to two opposite sides 11 of the bottom plate 10, and two end plates 30 pivotably mounted to two opposite ends 12 of the bottom plate 10. Each side 11 defines a sloping surface 111 slanting down. The bottom plate 10, the side plates 20, and the end plates 30 are made of resilient material, such as rubber or plastic.

Figure 3:
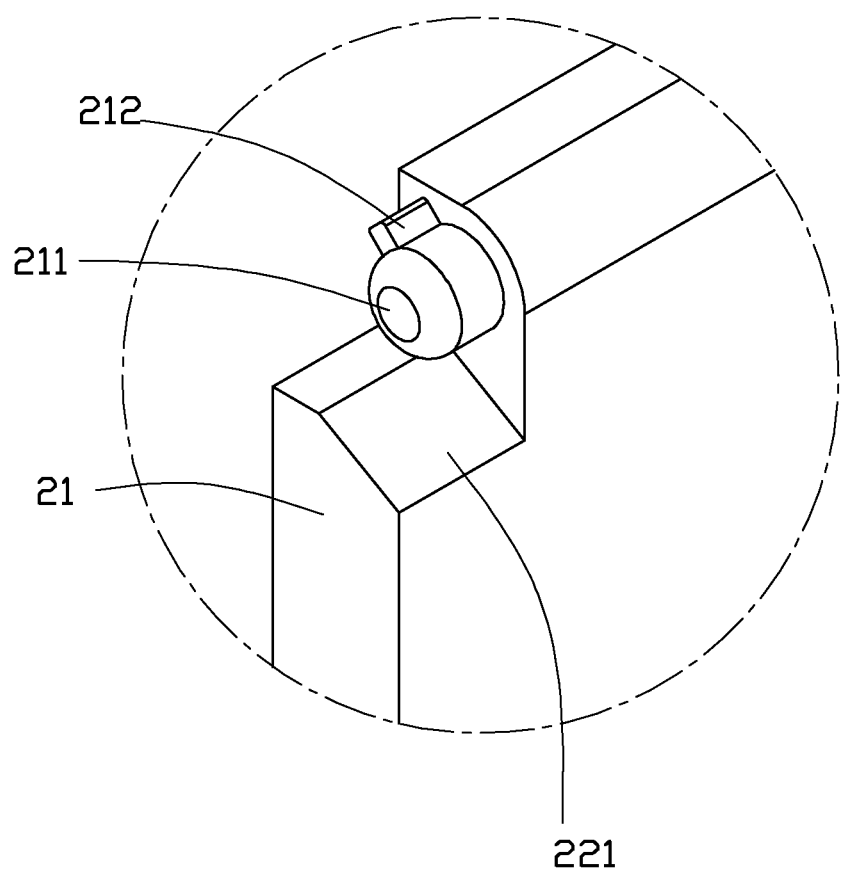
FIG. 3 is an enlarged view of the circled portion III of FIG. 2.
Figure 4:
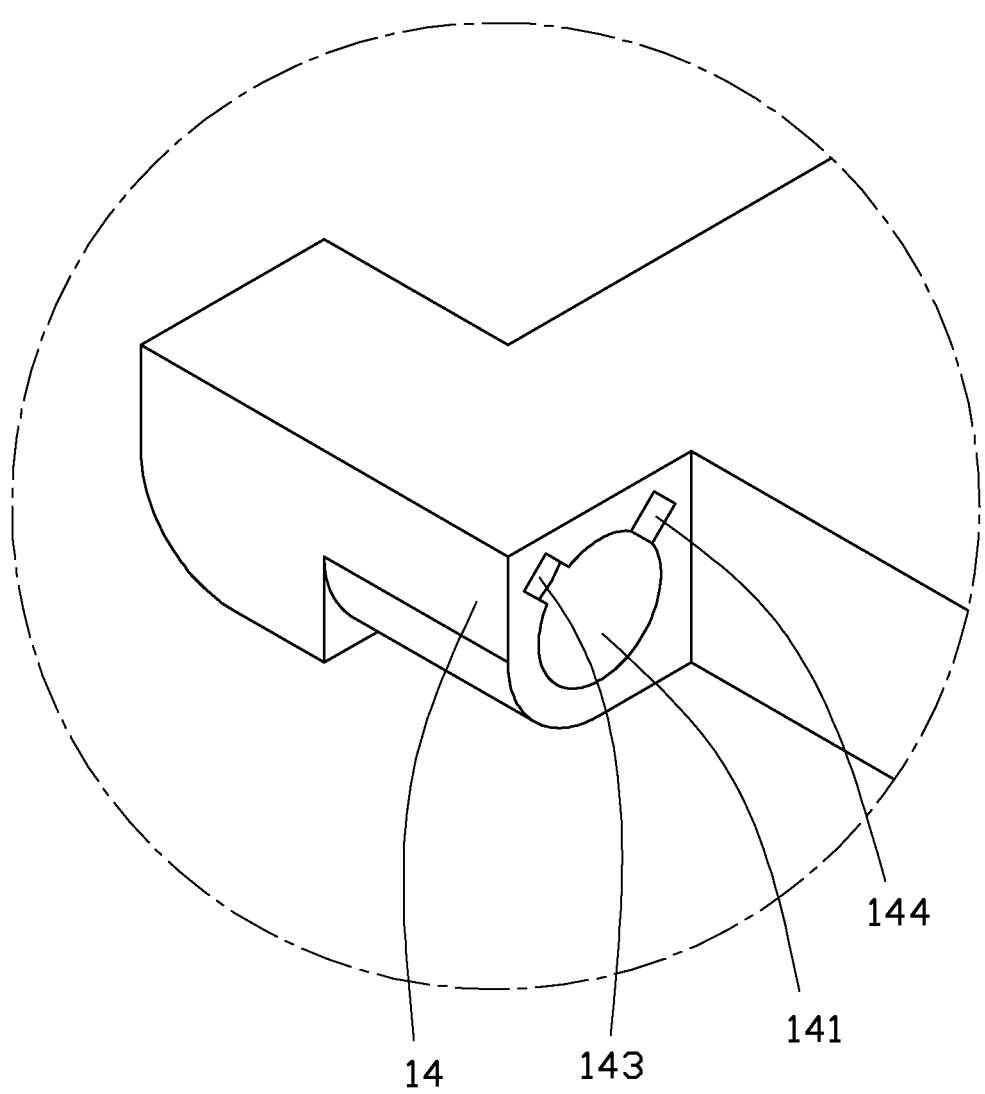
FIG. 4 is an enlarged view of the circled portion IV of FIG. 2.
Figure 5:
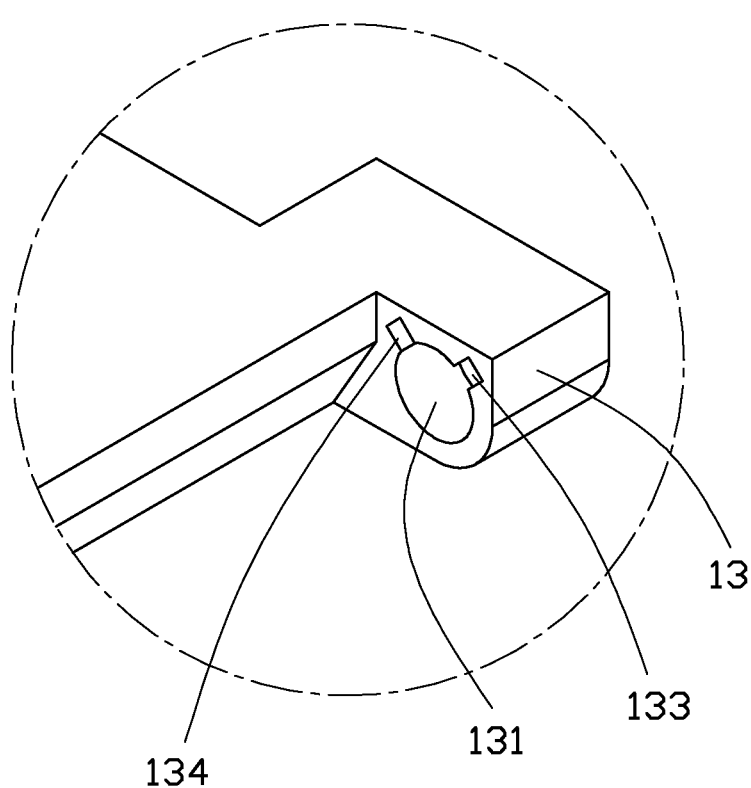
FIG. 5 is an enlarged view of the circled portion V of FIG. 2.

Referring to FIG. 3 to FIG. 5, the bottom plate 10 includes four first connecting portions 13 and four second connecting portions 14 formed at the four corners of the bottom plate 10. Two of the first connecting portions 13 are located at one of the sides 11, and the other two of the first connecting portions 13 are located at the other side 11. Two of the second connecting portions 14 are located at one of the ends 12, and the other two of the second connecting portions 14 are located at the other end 12. A first pivot hole 131 is defined in each first connecting portion 13, and faces the other first connecting portion 13 at the same side 11. A first positioning slot 133 and a second positioning slot 134 are defined in the inner surface bounding the first pivot hole 131 of one of the first connecting portions 13 at the same side 11. The first positioning slot 133 is angled at about 90 degrees from the second positioning slot 134. A second pivot hole 141 is defined in each second connecting portion 14, and faces the other second connecting portion 14 at the same end 12. A first positioning slot 143 and a second positioning slot 144 are defined in the inner surface bounding the second pivot hole 141 of one of the second connecting portions 14 at the same end 12. The first positioning slot 143 is angled at about 90 degrees from the second positioning slot 144. In this embodiment, the first connecting portion 13 and the second connecting portion 14 at each corner are connected together to form a protrusion 16.

Each side plate 20 is substantially a bar, and includes two projections 22 extending from opposite ends of the side plate 20. A first pin 211 extends from each end of the side plate 20, near the corresponding projection 22. The first pin 211 at one of the ends of the side plate 20 forms a flexible raised portion 212 on the circumference of the first pin 211, for engagement either in the first positioning slot 133 or in the second positioning slot 134 of a corresponding first connecting portion 13, thereby preventing any rotation of the side plate 20. A positioning hole 222 is defined in the top of each projection 22. Two mounting rods 24 extend from an outer surface of each of the side plates 20. Each projection 22 forms a sloping surface 221 facing the first pin 211.

Each end plate 30 defines two recesses 31 defined in opposite ends of the end plate 30. Two projections 32 extend from opposite ends of the end plate 30. Two second pins 311 extend into each recess 31 from the end plate 30. One of the second pins 311 forms a flexible raised portion 312 on the circumference of one of the first pins 311, for engagement in either the first positioning slot 143 or the second positioning slot 144, to prevent twisting of the end plate 30. A positioning protrusion 321 protrudes from an undersurface of each projection 32, and faces the corresponding recess 31. A sloping surface 313 is formed for bounding each recess 31 and faces the corresponding pin 311.

Figure 6:
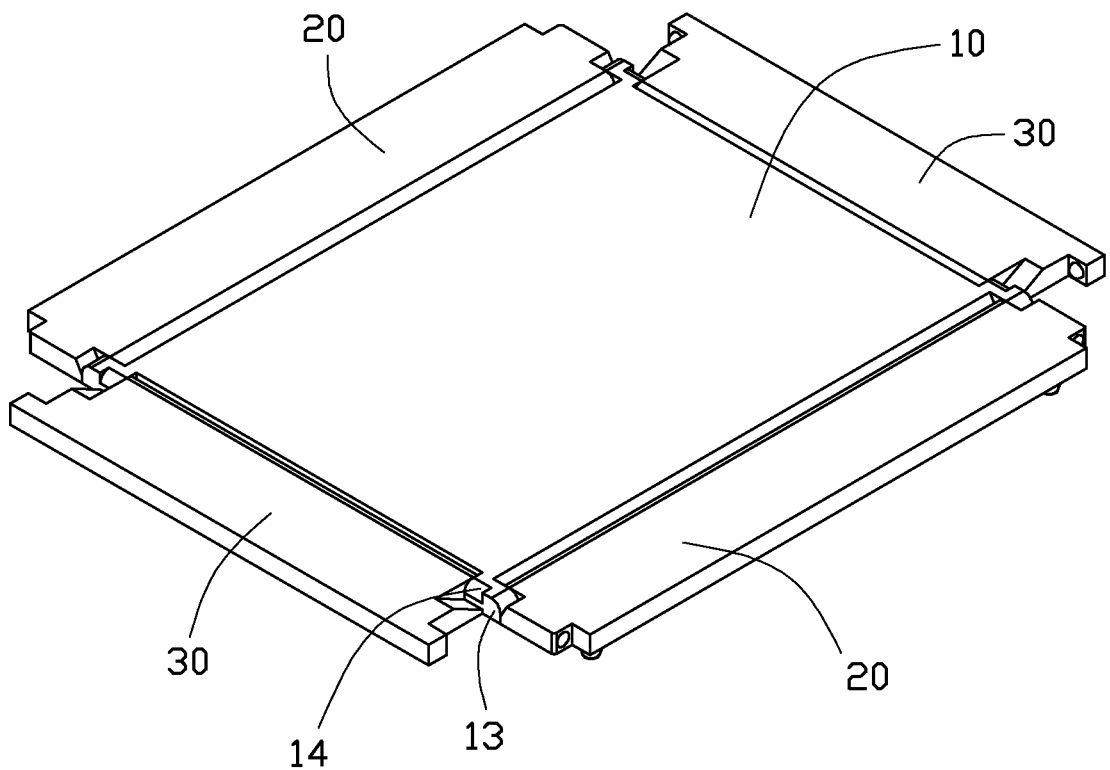
FIG. 6 is an assembled, isometric view of the dummy HDD of FIG. 1.

Referring also to FIG. 6, in assembly, each side plate 20 is attached to a corresponding side 11. The first pins 211 are pivotably inserted into the corresponding first pivot holes 131. Each end plate 30 is attached to a corresponding end 12. The second pins 311 are pivotably inserted into the corresponding second pivot holes 141. When the dummy HDD 100 is not being used, the side plates 20 and the end plates 30 are rotated relative to the bottom plate 10, until the side plates 20 and the end plate 30 are substantially coplanar with the bottom plate 10. The raised portions 212 are engaged in the corresponding second positioning slots 134, to position the side plates 20 so as to be coplanar with the bottom plate 10.

The raised portions 312 are engaged in the corresponding second positioning slots 144, to position the end plates 30 so as to be coplanar with the bottom plate 10. In this way, the dummy HDD 100 is transformed into a simple flat plate, to occupy the minimum of space.

Figure 7:
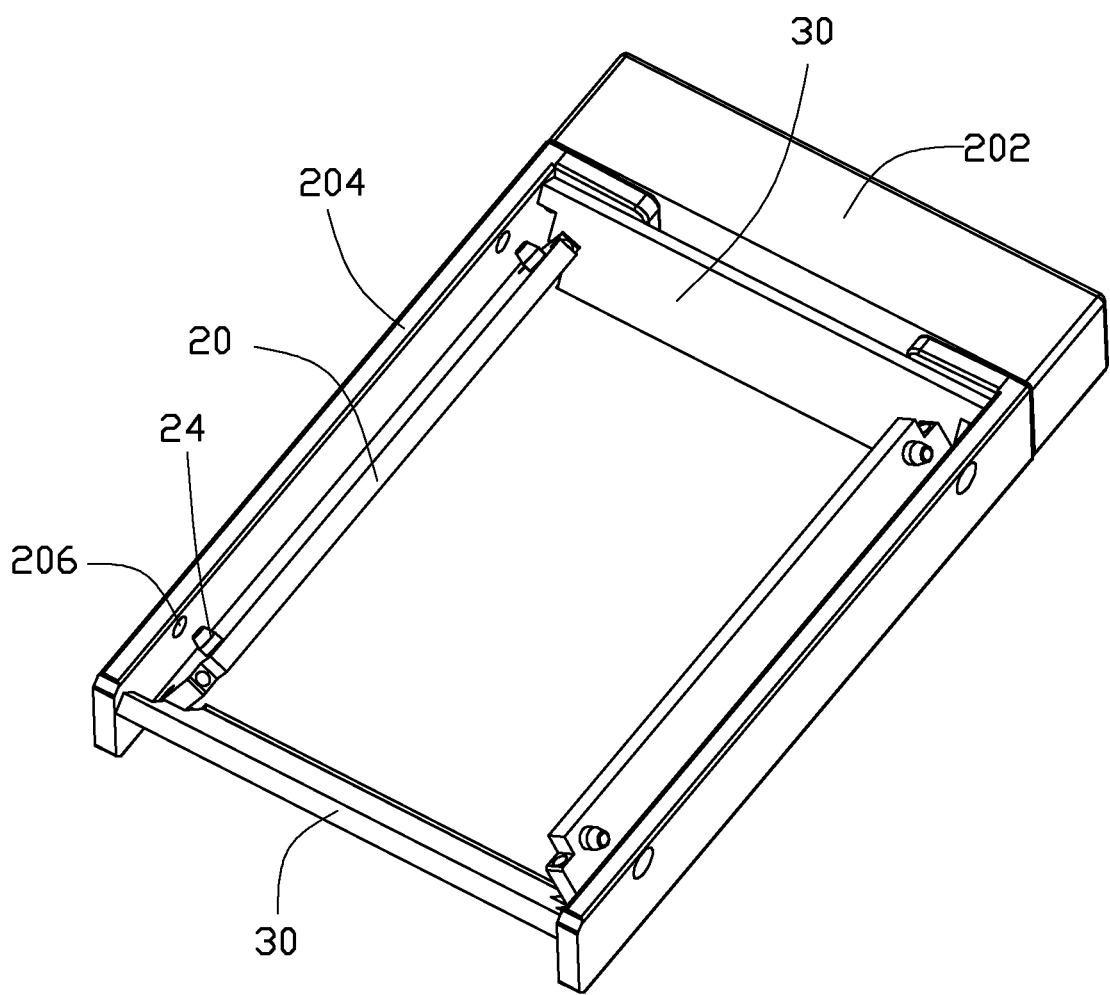
FIG. 7 and FIG. 8 are isometric views showing different states of use of the electronic device of FIG. 1.
Figure 8:
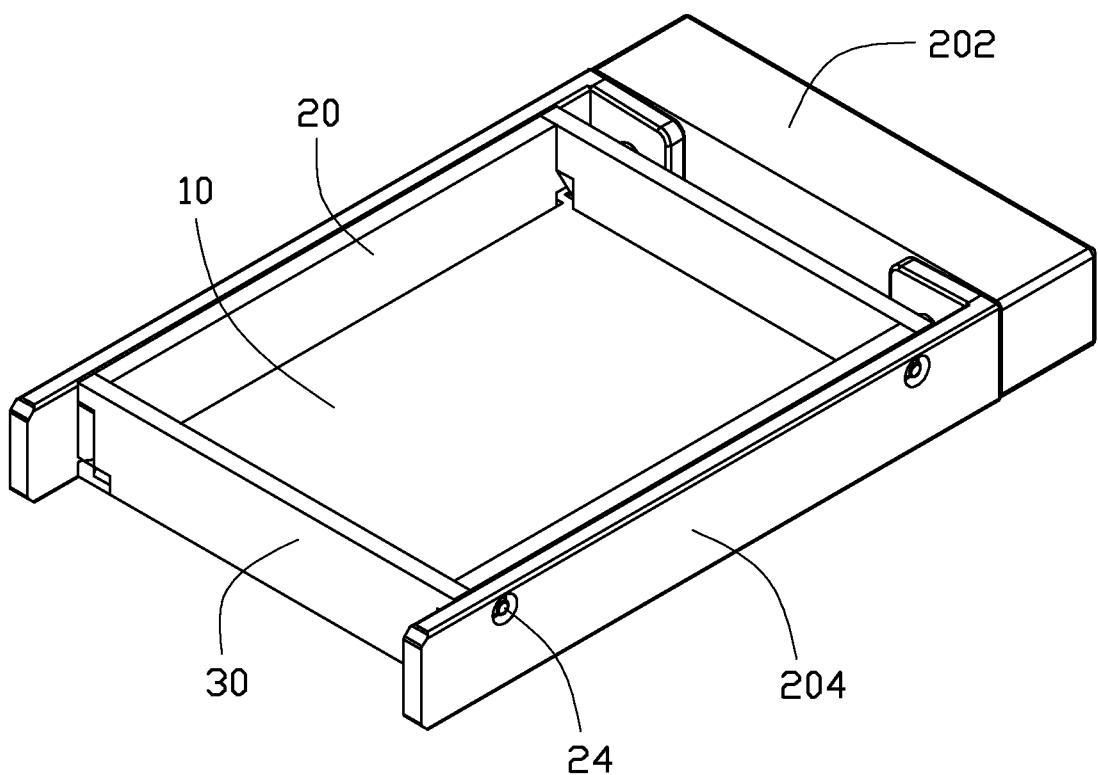

Referring to FIG. 7 and FIG. 8, the dummy HDD 100 is transformed into a rectangular frame, which can be mounted in the bracket 200. The HDD bracket 200 includes a base 202 and two parallel mounting plates 204 extending from opposite ends of the base 202. Each mounting plate 204 defines two mounting holes 206. The side plates 20 are rotated to be at an acute angle relative to the bottom plate 10, and the end plates 30 are rotated to be at an obtuse angle relative to the bottom plate 10. The dummy HDD 100 is arranged between the mounting plates 204. The side plates 20 are then rotated toward the corresponding mounting plates 204, until the mounting rods 24 are engaged in the corresponding mounting holes 206. The end plates 30 are rotated toward the bottom plate 10 in a direction which will make the end plates 30 perpendicular to the bottom plate 10, until the positioning protrusions 321 are engaged in the corresponding positioning holes 222. The side plates 20 and the end plates 30 are all perpendicular to the bottom plate 10. The raised portions 212 are engaged in the corresponding first positioning slots 133, to position the side plates 20 perpendicular to the bottom plate 10. The raised portions 312 are engaged in the corresponding first positioning slots 143, to position the end plates 30 perpendicular to the bottom plate 10.

The sloping surfaces 221 and 313 prevent the side plates 20 and the end plates 30 interfering with the first connecting portions 13 and the second connecting portions 14. The sloping surfaces 111 prevent the side plates 20 interfering with the corresponding sides 11. In an alternative embodiment, the first connecting portions 13 may be lengthened to prevent the side plates 20 interfering with the sides 11.

In this embodiment, the bottom plate 10, the side plates 20, and the end plates 30 are pivotably connected to form the dummy HDD 100. When the dummy HDD 100 is needed in the HDD bracket 200, the dummy HDD 100 can be transformed into a strong rectangular frame, without using screws and tools. When not in use, the dummy HDD 100 can be completely flattened for easy packing and transporting.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   a base;
   two parallel mounting plates extending from the base, each of the mounting plates defining two mounting holes; and
   a dummy hard disk drive comprising a bottom plate, two side plates pivotably mounted to two opposite sides of the bottom plate, and two end plates pivotably mounted to two opposite ends of the bottom plate, two mounting rods extending from an outer surface of each of the side plates;
   wherein the side plates and the end plates are operable to rotate to be substantially perpendicular to the bottom plate to form a hollow rectangular frame, the mounting rods are inserted in the corresponding mounting holes, to mount the dummy hard disk drive between the mounting plates;
   wherein when the dummy hard disk drive is not being used, the side plates and the end plates are rotated relative to the bottom plate, until the side plates and the end plate are substantially coplanar with the bottom plate; and
   wherein when the dummy hard disk drive is used to be transformed into a rectangular frame, the side plates are rotated to be at an acute angle relative to the bottom plate, the end plates are rotated to be at an obtuse angle relative to the bottom plate, then the dummy hard disk drive is arranged between the mounting plates, the side plates are then rotated toward the corresponding mounting plates, until the mounting rods are engaged in the corresponding mounting holes and the side plates is perpendicular to the bottom plate, the end plates are rotated to be perpendicular to the bottom plate.

2. The electronic device of claim 1, wherein the bottom plate, the side plates, and the end plates are made of resilient material.

3. The electronic device of claim 1, wherein the bottom plate is substantially rectangular, and comprises four first connecting portions formed at four corners of the bottom plate and four second connecting portions formed at the four corners, each side plate is pivotably connected between the first connecting portions at a same one of the two opposite sides of the bottom plate, each end plate is pivotably connected between the second connecting portions at a same one of the two opposite ends of the bottom plate.

4. The electronic device of claim 3, wherein a first pivot hole is defined in each first connecting portion, each side plate comprises two projections extending from opposite ends of the side plate, two first pins extend from the ends of the side plate below the corresponding projections, the first pins are pivotably engaged in the corresponding first pivot holes.

5. The electronic device of claim 4, wherein a positioning slot is defined in an inner surface bounding one of the first pivot holes of each side of the bottom plate, one of the first pins of each side plate forms an elastic raised portion on the circumference of the one of the first pins, for engagement in the positioning slot to position the side plate substantially perpendicular to the bottom plate.

6. The electronic device of claim 4, wherein a second pivot hole is defined in each second connecting portion, each end plate comprises two projections extending from opposite ends of the end plate, two second pins extend from the ends of the end plate below the corresponding projections, the second pins are pivotably engaged in the corresponding second pivot holes.

7. The electronic device of claim 6, wherein a positioning slot is defined in an inner surface bounding one of the second pivot holes of each end of the bottom plate, one of the second pins of each end plate forms an elastic raised portion on the circumference of the one of the second pins, for engagement in the positioning slot to position the end plate substantially perpendicular to the bottom plate.

8. The electronic device of claim 3, wherein the side plates and the end plates each form two sloping surfaces at opposite ends, for preventing the side plates and the end plates from respectively interfering with the first connecting portions and the second connecting portions.

9. The electronic device of claim 1, wherein the sides of the bottom plate each form a sloping surface, for preventing the side plates interfering with the corresponding sides of the bottom plate.

* * * * *